May 13, 1924.
C. O. BASTIAN
1,494,207
APPARATUS FOR HEATING WATER ELECTRICALLY
Filed Aug. 16, 1920    2 Sheets-Sheet 1
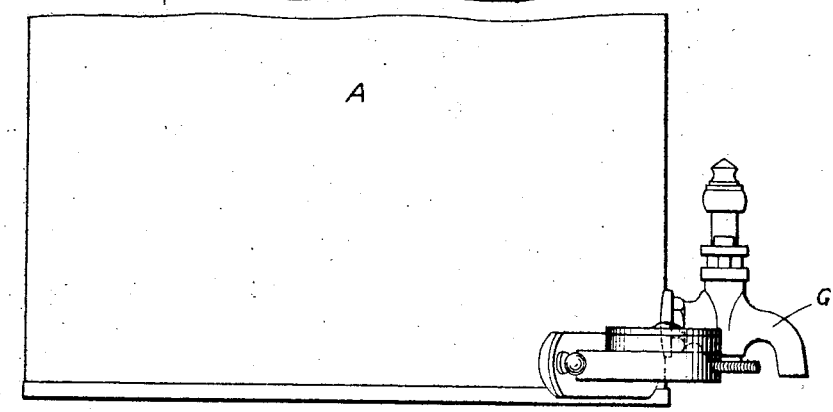
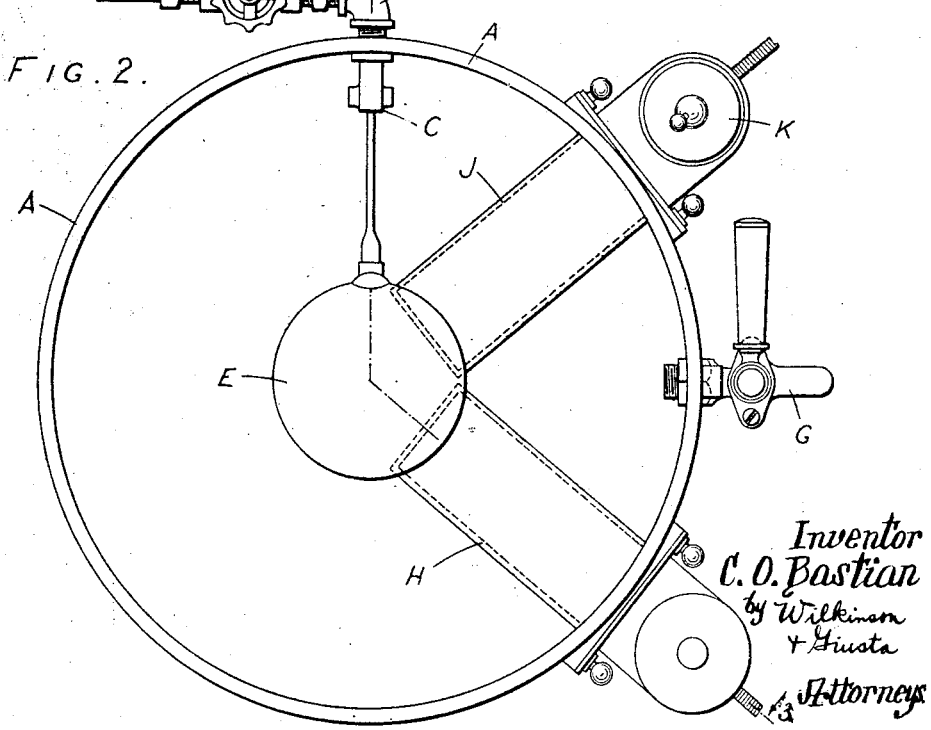
Inventor
C. O. Bastian
by Wilkinson
& Fiusta
Attorneys May 13, 1924.

C. O. BASTIAN 1,494,207

APPARATUS FOR HEATING WATER ELECTRICALLY

Filed Aug. 16, 1920    2 Sheets—Sheet 2

Inventor
C. O. Bastian
by Wilkinson & Giusta
Attorneys

Patented May 13, 1924.

1,494,207

UNITED STATES PATENT OFFICE.

CHARLES ORME BASTIAN, OF LONDON, ENGLAND, ASSIGNOR OF ONE-HALF TO ROBERT HALL FORMAN, OF LONDON, ENGLAND.

APPARATUS FOR HEATING WATER ELECTRICALLY.

Application filed August 16, 1920. Serial No. 404,017.

*To all whom it may concern:*

Be it known that I, CHARLES ORME BASTIAN, electrical engineer, residing at 32 The Avenue, Brondesbury Park, London, England, a subject of the King of Great Britain, have invented Apparatus for Heating Water Electrically, of which the following is a specification.

My present invention has for its object to provide an improved method and means of obtaining a supply of hot water at some predetermined and approximately constant temperature below boiling point and consists (inter alia) in correlating three factors namely (1) the rate at which the heat is supplied, (2) the heat dissipating capacity of the water container, (3) the rate at which cold water is fed into the container. These three factors are so proportioned and correlated according to my present invention, that the water in the container can never exceed the temperature at which the absorbed and occluded gases are expelled, and consequently there is a minimum deposit of lime in the container, and on the taps and valves and the water does not assume that condition or character which is popularly described as "stewed water."

Water heated according to my present invention can therefore be used subsequently for the purpose of making tea and other beverages, or for culinary or other purposes for which "stewed water" is not considered suitable.

My present invention may be carried into practice as follows:—

I employ for example a 10 gallon polished copper cylindrical tank (the diameter equal to the depth) fitted with a ball valve or equivalent device controlling a cold water feed adapted to admit feed water at the rate of 10 gallons per 24 hours or thereabouts as water is withdrawn from the tank and fitted with an electric heating device of the submerged type which may be of only 150 watts capacity. This will provide a supply of ten gallons of water about 104° F. above the temperature of the feed water every 24 hours with the heating device continually in circuit and under average atmospheric conditions.

With a polished copper tank of the same cubic capacity but so shaped as to have double the surface area, the rate of feed may be doubled so as to enable a supply of 20 gallons of water to be drawn off at the same temperature as above specified every 24 hours, with a heating device of double the calorific value i. e. equal to 300 watts.

In many cases it will be more convenient to employ a 20 gallon tank of the correct surface area for the 20 gallon daily supply on account of the increased storage capacity.

If no water be drawn from the tanks or much less than the 10 gallons or 20 gallons available respectively the temperature will not rise above 180° F. at times when the feed water is at 70° F. as in the hottest summer weather in the British Isles. In other climates where the average temperature is lower or higher than the aforesaid it is obvious that extra or diminished heating capacity will be required in order to attain and maintain the desired temperature above that of the feed water.

Whilst it is advantageous to so proportion the heating effect to the heat dissipating capacity of the tank as to make it impossible for the water to exceed the temperature of 180° F. because of the disproportionately high heat losses above that temperature and so as to avoid furring of the tank and taps it is equally advantageous and an essential feature of this invention to also proportion the rate at which the feed water can enter the tank to the rate at which heat is supplied so that the feed water may be raised to its final steady temperature immediately and without temporarily cooling the residual water in the tank, as would be the case if the feed water were to enter the tank at a more rapid rate whenever water is withdrawn through the draw-off tap.

It will be seen from the foregoing that the quantity of hot water available during any predetermined period is limited to the quantity of feed water that can enter the tank or container during that period and this quantity must be so proportioned to the rate at which heat is supplied as to produce no cooling effect on the water already in the tank.

On the other hand the rate at which heat is supplied is so proportioned to the heat dissipating capacity of the tank that the temperature of the body of water in the tank can never attain 212° F. and is preferably limited to 180° F.

In the case of a polished copper tank or nickel plated and polished tank my invention can be realized by means of a heat supply equivalent to 0.15 watt per square inch of tank surface—for normal English climate—and a rate of feed equal to 1 pint in 16 minutes for a 10 gallon supply every 24 hours, 1 pint in 8 minutes for a 20 gallon supply every 24 hours and so on.

Referring to the drawings:—

Fig. 1 is a view in side elevation of a cylindrical shaped tank fitted according to the present invention with means to automatically regulate the supply of fresh water to said tank at a predetermined rate proportioned to the rate at which heat is supplied to said tank and fitted with electrical means to supply heat at a predetermined rate proportioned to the surface area of said tank as specified according to this invention.

Fig. 2 is a plan view of Fig. 1 with the lid or cover of said tank removed.

A is the tank of cylindrical shape.

B is the water supply pipe leading the supply of water from any suitable source of supply to the valve nozzle C the outlet from which latter is controlled by a ball cock or valve D and float E of the well-known type.

F is a screw-down valve of any well-known or suitable type for regulating the supply of water through the supply pipe B or if desired for cutting off said supply entirely.

G is the draw-off cock.

Figure 3:
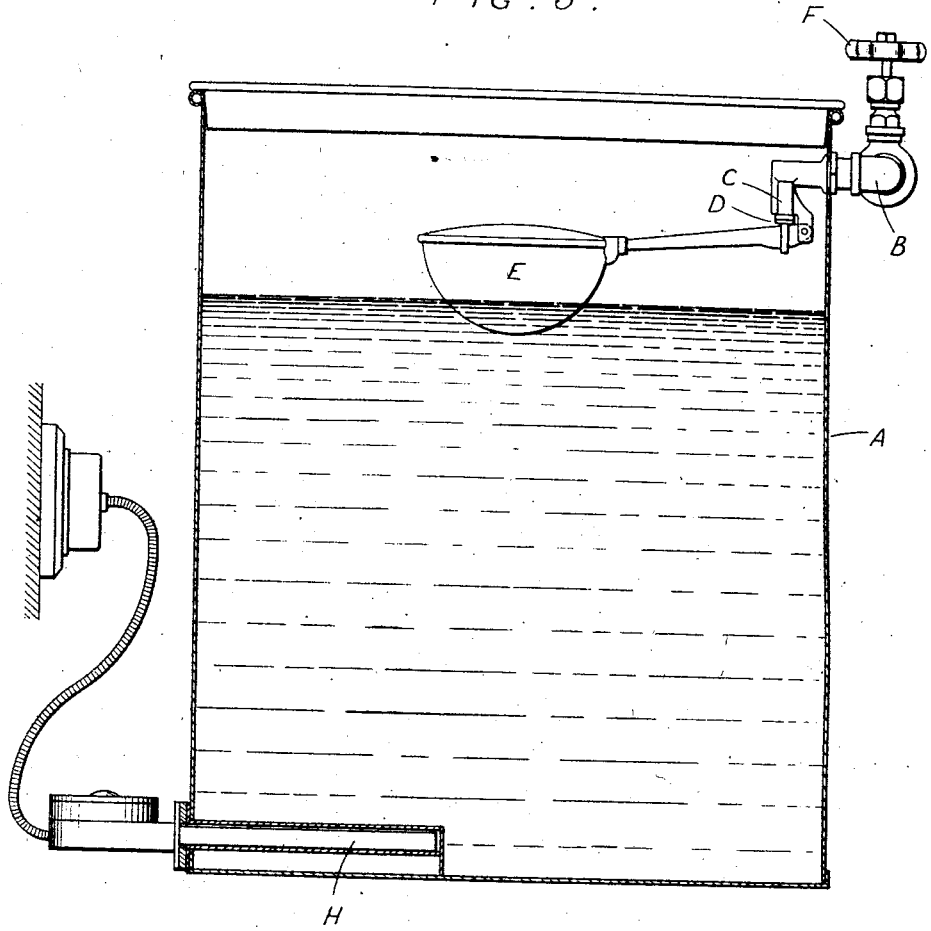
Fig. 3 is a vertical sectional view on the line 3—3 Fig. 2 looking in the direction of the arrows.
Figure 4:
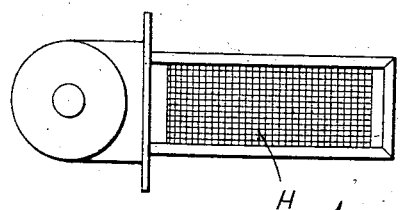
Fig. 4 is a plan view of the heater element separate from the tank.

H is heater element of any suitable type electrically connected in any suitable manner to any source of electric supply—for example by means of a wall fitting as indicated in Fig. 3.

I may employ any suitable lagging and cotton wool is a very effective heat insulating material for this purpose.

The use of such lagging will permit lower voltages to be employed than those hereinbefore referred to which are the voltages for unlagged polished copper tanks.

If desired an auxiliary or second and separate heating element J may be provided controlled by a switch K for use when water at higher temperatures or when more rapid heating is required.

What I claim is:—

1. The method of operating electric water heating apparatus of the thermal storage type which method consists in maintaining a constant ratio or balance between the heat units per hour supplied to the apparatus, the heat dissipating capacity of the water container, and the volume of water per hour supplied to the container, whereby a constant temperature, below boiling point, of the whole volume of water is maintained irrespective of variation of said volume.

2. In an electric water heating apparatus of the thermal storage type the combination of a reservoir having, at the operating temperature below boiling point, a heat dissipating capacity bearing a constant ratio to the heat supplied, an electric heating element attached to said reservoir, a float operated valve adapted automatically to close the water inlet to the reservoir when the latter is full, and a second valve adapted and adjusted to admit to said reservoir, when the float valve is open, a supply of water at a predetermined constant flow bearing a fixed ratio to the heat supplied whereby, in working, the whole volume of water in the reservoir is constantly maintained at the predetermined operating temperature irrespective of variation in said volume.

C. ORME BASTIAN.